United States Patent
Huang

(10) Patent No.: US 6,618,397 B1
(45) Date of Patent: Sep. 9, 2003

(54) GROUP PACKET ENCAPSULATION AND COMPRESSION SYSTEM AND METHOD

(75) Inventor: Zezhen Huang, Canton, MA (US)

(73) Assignee: Provisionpoint Communications, LLC., Arlington, MA (US)

( * ) Notice: Subject to any disclaimer, the term of this patent is extended or adjusted under 35 U.S.C. 154(b) by 0 days.

(21) Appl. No.: 09/789,852

(22) Filed: Feb. 21, 2001

Related U.S. Application Data

(60) Provisional application No. 60/238,213, filed on Oct. 5, 2000.

(51) Int. Cl.[7] .................................................. H04J 3/24
(52) U.S. Cl. ........................................ 370/474; 370/392
(58) Field of Search ............................... 370/398–401, 370/465–477, 521, 392, 349, 389, 402, 428, 410; 709/247, 216, 217, 246

(56) References Cited

U.S. PATENT DOCUMENTS

| | | | | |
|---|---|---|---|---|
| 5,282,207 A | * | 1/1994 | Jurkevich et al. ............ | 370/392 |
| 5,293,379 A | * | 3/1994 | Carr ............................. | 370/392 |
| 5,307,413 A | * | 4/1994 | Denzer ......................... | 370/392 |
| 5,535,199 A | * | 7/1996 | Amri et al. ................... | 370/401 |
| 5,774,467 A | * | 6/1998 | Herrera Van Der Nood et al. ........... | 370/428 |
| 5,910,385 A | * | 6/1999 | Mita et al. .................... | 370/349 |
| 6,032,197 A | * | 2/2000 | Birdwell et al. ............. | 709/247 |
| 6,151,318 A | * | 11/2000 | Woodward et al. ......... | 370/392 |

* cited by examiner

Primary Examiner—Dang Ton
Assistant Examiner—Phuc Tran
(74) Attorney, Agent, or Firm—McDermott, Will & Emery

(57) ABSTRACT

A group packet encapsulation and (optionally) compression system and method, including an encapsulation protocol increases packet transmission performance between two gateways or host computers by reducing data-link layer framing overhead, reducing packet routing overhead in gateways, compressing packet headers in the encapsulation packet, and increasing loss-less data compression ratio beyond that otherwise achievable in typical systems. Packets queued at a node configured in accordance with the present invention are classified, grouped, and encapsulated into a single packet as a function of having another such configured node in their path. The nodes exchange encapsulation packets, even though the packets within the encapsulation packet may ultimately have different destinations. Compression within an encapsulation packet may be performed on headers, payloads, or both.

33 Claims, 9 Drawing Sheets

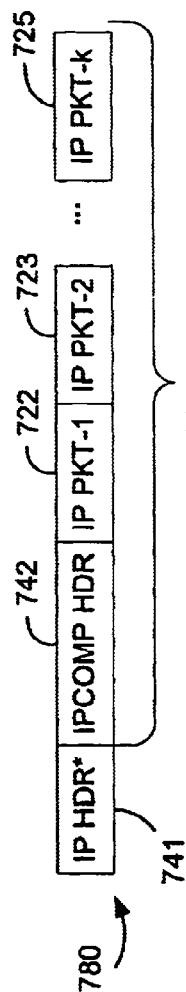
FIG. 7D (ENCAPSULATION SCHEME A)
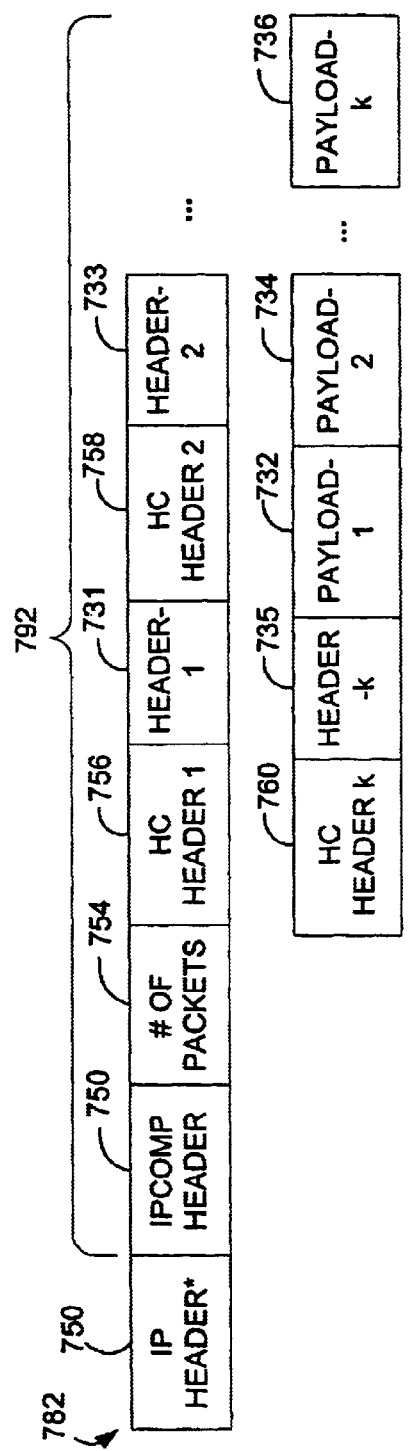
FIG. 7E (ENCAPSULATION SCHEME B)
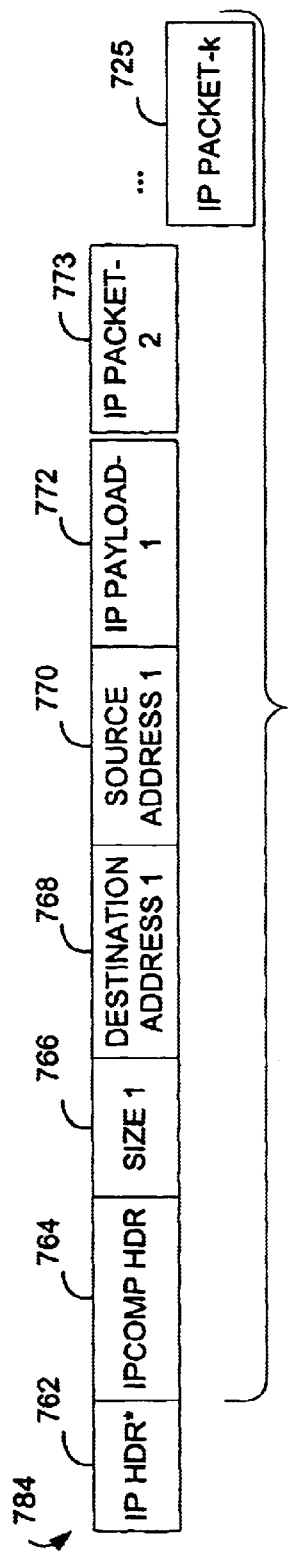
FIG. 7F (ENCAPSULATION SCHEME C)

GROUP PACKET ENCAPSULATION AND COMPRESSION SYSTEM AND METHOD

CROSS REFERENCE TO RELATED APPLICATIONS

This application claims the benefit of priority from U.S. Provisional Patent Application Ser. No. 60/238,213, filed Oct. 5, 2000, entitled Group IP Packet Encapsulation and Compression.

FIELD OF THE INVENTION

The present invention generally relates to the field of electronic communications. More specifically, the present invention relates to communication protocol systems and methods used in such electronic communications.

BACKGROUND OF THE INVENTION

The Internet protocol (IP) is the standard protocol for carrying out data transmission over the Internet. Prior art FIG. 1 shows an open system interconnect (OSI) model 100 that depicts the different layers of processing involved in IP data communication within a gateway or host computer. The model 100 includes application 102, presentation 104, session 106, transport 108, network 110, data link 112, and physical 114 layers. Each layer understands a certain communication protocol, which among other things contains a specific packet format. Each layer also employs a standard method of encapsulating and de-encapsulating packets received from upper and lower layers. When a layer receives a packet of data from an upper layer, that layer encapsulates the packet into a new packet conforming to the packet format the layer understands. The layer then passes the new packet to the next lower layer. When a layer receives a packet of data from a lower layer, the receiving layer retrieves (i.e., deencapsulates) the encapsulated inner packet and passes it to the next upper layer.

Prior art FIG. 2 shows a group of diagrams 200 that illustrate encapsulation at various layers of model 100 as an example of UDP/IP over Ethernet, i.e., from the transport layer 108 to the network layer 110 and then to the data link layer 112. At the transport layer 108, a UDP packet 220 includes a UDP header 202 and data 210. At the network layer 110, the IP packet 230 includes the UDP packet 220 and an IP header 204. And, at the data link layer 112, the IP packet 230 is encapsulated in an Ethernet header 206 and trailer 208, as an Ethernet frame 240. The Ethernet frame 240 is transmitted to a physical network connection. It can be seen from FIG. 1 and FIG. 2, for each layer of encapsulation the packet size is increased, which means more bandwidth is consumed. For example, the Ethernet header 206 and trailer 208 together add 26 bytes. That is, for each IP packet transmitted, there will be 26 bytes of overhead in Ethernet framing.

FIG. 3 illustrates an example of prior art data communication between nodes, e.g., gateway/host A 310 and gateway/host D 340, which includes transit through gateway B 320 and gateway C 330. The data-link layer technologies employed by each connection may be different. For illustrative purposes, assume the direction of data communication is from gateway/host A 310 to gateway/host D 340. For each frame of data received in a gateway (e.g., gateway 320 or 330), the gateway needs to determine (referred to as routing) which gateway in the next hop to send the data, and may need to retrieve the IP packet from the frame and encapsulate the IP packet in a different data-link framing technology before relaying it to the next hop gateway. Such processing consumes computing power and memory and causes transmission delay. If data traffic is heavy in a gateway, the gateway may not be able to transmit the data as fast as it is received and network congestion and delays result due to excess contention for limited gateway resource and bandwidth.

IP header compression is a prior art technique that can reduce a packet's size and result in more efficient packet transportation. There are some Internet standard methods for IP header compression, such as IP/TCP header compression (RFC 1144) and IP/UDP/RTP header compression (RFC 2508). Header compression relies on many fields in the header being constant or changing seldomly in consecutive packets belonging to the same packet stream. Fields that do not change between packets need not be transmitted at all. To initiate compression of the headers of a packet stream, a full header carrying a context identifier (CID), is transmitted over the link. The compressor and decompressor store most fields of this full header in a context structure and the CID to be associated with the context structure. The context structure comprises the fields of the header whose values are constant and thus need not be sent over the link at all, or change little between consecutive headers so that it uses fewer bits to send the difference from the previous value compared to sending the absolute value. After context structure and its CID has been synchronized between the compressor and the decompressor, the compressor can then compress packet headers by computing the difference between the headers and the initial values stored in the context structure and encoding only the non-zero values of the difference. After receiving the compressed header together with the CID, the decompressor retrieves the context structure using the CID and decompresses the compressed header. Header compression is most effective for small packets where the overhead header is significant. The problem with IP header compression is that, the compressed packet is no longer a standard IP packet and it depends on the data-link layer to carry the compression information such that the receiving node can decompress the header and recover the original packet. This requires that the receiving node.must have a data-link layer direct connection with the sending node. Therefore, IP header compression has been applied only on a link-by-link basis. In today's public Internet, packet may traverse over many intermediate routers before reaching the receiving node. As shown in FIG. 3, packets originated from Node A 310 traverse over Node B 320 and Node C 330 before reaching Node D 340. Therefore, IP header compression cannot be applied just between Node A 310 and Node D 340.

IP payload compression (IPComp) is another prior art technique for improving packet transportation efficiency. IPComp is an Internet standard method (RFC-2393). IPComp reduces the size of IP payload before passing the IP packet to the data-link layer, and therefore increases the overall communication performance between a pair of communicating hosts/gateways ("nodes"). The IPComp protocol operates at the network layer 110 in the OSI model 100, illustrated in FIG. 1.

The compression processing of IP packets has two phases: compressing of outbound IP packets ("compression") and decompressing of inbound IP packets ("decompression"). The compression processing must be loss-less, ensuring that the IP packet, after being compressed and decompressed, is identical to the original IP packet. Additionally, the compression processing must enforce a non-expansion policy, that is, if the compressed packet is larger than the original packet, the original packet will be transmitted.

The data link layer typically imposes a maximum transmission unit (MTU). For example, the Ethernet has a MTU of 1500 bytes. The non-expansion policy ensures the packet would not exceed the MTU, which would cause packet fragmentation and result in increased overhead. Each IP packet is compressed and decompressed by itself without any relation to s other packets ("stateless compression"), as IP packets may arrive out of order or not arrive at all. Each compressed IP packet encapsulates a single IP payload.

An original IP packet 400 is shown in prior art FIG. 4A. IP packet 400 is shown in a compressed form 420 in FIG. 4B, in accordance with the prior art protocol IPComp. The compressed IP packet 420 contains a modified IP header 422, an IPComp header 424, and compressed.payload data 426. The payload data 426 may be compressed using any known loss-less compression algorithm. The modified (indicated by the asterisk) IP header 422 shown in FIG. 4B contains a new protocol identification, which is used by the remote node to identify the packet as an IPComp compressed packet. The modified IP header 422 also contains new value of total length and header checksum for the compressed IP packet 420.

As shown in prior art FIG. 4C, an IPComp header 450 consists of four-octets, 0 through 3 (i.e., 4 bytes), where the field 452 stores an IP (v.4) protocol field or an IP (v.6) Next Header field of the original IP header; the "Flags" fields 454 is typically reserved and set to zero; the "Compression Parameter Index" (CPI) field 456 identifies the compression algorithm used. The remote node receiving the compressed IP packet will choose the correct decompression algorithm according to CPI 456.

To utilize the IPComp protocol, two nodes must first establish a compression association (CA) between them. The CA includes all required information for the operation of IPComp, including the CPI, the mode of operation, the compression algorithms to be used, and any required parameter for the selected compression algorithm. Generally, IPComp operation is known in the art, so not discussed in detail herein.

One problem with IPComp is that it requires each IP packet to be compressed individually without any relation to other packets. This requirement limits the ability to compress IP data, so a certain amount of inefficiency generally has been tolerated, as being unavoidable.

SUMMARY OF THE INVENTION

The invention is a system and method for group packet encapsulation and (optionally) compression. The system and method increase packet transmission performance between two gateways or host computers by reducing data-link layer framing overhead, reducing packet routing overhead in gateways, reducing packet header overhead, and increasing loss-less data compression ratio beyond that otherwise achievable with standard protocols, such as IPComp. To accomplish this, the system and method implement an encapsulation protocol of the present invention, which, as an-example, can be used with IP packets, as a group IP packet encapsulation and (optionally) compression (GIEC) system and method.

In many situations, a communication device (e.g., node) may accumulate multiple packets in its internal queue before passing them to the data link layer. The packet accumulation could be the result of, as examples, a TCP/UDP protocol sending multiple packets at the same time, network congestion blocking packets in queue, multiple TCP/UDP flows transmitting simultaneously between two nodes (e.g., gateways/hosts) or some combination thereof.

In accordance with the encapsulation protocol, two communication nodes (e.g., a Node-X and a Node-Y) establish one or more protocol "associations". A node could be a gateway, host computer or some other known communication device. In this example, Node-X and Node-Y may be configured with modules that implement the system, method, and protocol of the present invention. Node-X establishes a protocol association for-Node-Y. Among other things, a protocol association for Node-X includes an address map. The address map comprises a list of addresses of nodes for which packets transmitted from Node-X can pass through to get to Node-Y. An address for a node could be an address for an end system or a subnet address representing a sub-network, as examples. Similarly, Node-Y can establish a protocol association for Node-X. For packets being transmitted from Node-X to Node-Y, only one protocol association is required.

In accordance with the present invention, when Node-X is preparing to transmit packets, Node-X determines which of those packets has a destination address that matches an address in the address map. The packets are grouped according to having a common destination or intermediate node in their path. For a given node address (e.g., Node-Y) in the address map, Node-X dynamically combines the group of packets into one encapsulation packet with one encapsulation packet header and one encapsulation payload. The encapsulation payload contains the original packet headers and payloads. Node-X may optionally compress at least a portion of the original packet headers and/or payloads in the encapsulation payload, according to known compression techniques. The encapsulation packet header contains a special protocol identifier referred to as an encapsulation packet protocol ID. Node-X transmits the encapsulation packet to, in this example, Node-Y. When Node-Y receives the encapsulation packet, the encapsulation packet protocol ID (or other information encoded in the encapsulation packet) is used by Node-Y to identify the received packet as an encapsulation packet in accordance with the present invention. Node-Y retrieves the encapsulation payload, decompresses the payload, if it has been compressed, and then de-encapsulates the encapsulation payload. After de-encapsulating, Node-Y recovers the original group of packets and forwards them to the appropriate gateways or end systems. That is, for those packets for which Node-Y is not the ultimate destination, the packets are sent on to their destinations from Node-Y.

The system and method of the present invention, implementing the encapsulation protocol, improves transmission performance in a variety of manners. For example, data link framing overhead is reduced, which results in reduced bandwidth consumption. That is, instead of incurring n framing overheads for n packets, by encapsulating these n packets into one packet, there will be only one framing overhead. Additionally, packet routing overhead in gateways is reduced. Instead of incurring n overheads in routing n packets, by encapsulating these n packets into one encapsulation packet, there is one overhead, as if routing only one packet. And, because the encapsulation IP packet is a regular IP packet that can traverse any intermediate routers in an IP network, IP header compression can be applied on IP packets contained in the encapsulation payload without requiring Node-X and Node-Y to have a direct data-link connection. Also, if compression is applied in IP payloads-contained in the encapsulation payload, the set of data that comprise these payloads can be compressed together, rather than compressing each IP packet payload individually, as is done in the prior art systems. As a result, the compression ratio may be increased, because more data are compressed together within a single packet, resulting in reduced bandwidth consumption.

The encapsulation protocol may further employ an intelligent adaptive algorithm (IAA) to prevent the encapsulated and (optionally) compressed packet from-exceeding the MTU. Exceeding the MTU causes packet fragmentation and re-assembly, which inevitably introduces overhead in processing and bandwidth. The IAA, at a macro level, includes at least two steps. First, the compression ratio for packet header compression and payload compression for packets destined for the same remote node is estimated dynamically. The compression ratio is defined as the size of buffer before compression divided by the size of buffer after compression. The compression ratio can be estimated from compression ratios obtained from the previous packets. The compression ratio can also be continuously updated as an average, over a chosen window of time. If no compression is applied, the compression ratio can be set to 1, referred to as "null" compression. Second, a determination is made of the maximum length of the encapsulation packet before compression is applied. The maximum length determines how many packets can be encapsulated together without exceeding the MTU. The maximum length is determined based on the known MTU for the corresponding link and the estimated compression ratio.

Preferably, the encapsulation protocol is backward compatible with known protocols, such as IPComp. That is, the system and method of the present invention may employ a protocol ID that is adapted from a protocol ID otherwise assigned to a known protocol (e.g., IPComp). In such a case, the encapsulation protocol employs special values in the CPI for identifying, as an encapsulation protocol, a known protocol. As an example, a standard IPComp header contains a 16-bit CPI that identifies a compression algorithm. The known IPComp standard, defined in RFC-2393, allocates CPI values 0–63 for well-known compression algorithms and allocates values 61440–65535 for private use among cooperating parties. As an example, the encapsulation protocol may designate a value range, in the unassigned value range of 61440–65535, to identify the encapsulation protocol. CPI values in this range may be referred to as encapsulation CPI values. Multiple sets of value ranges can be assigned, for example, $(61440+D*100)–(61540+D*100-1)$, where $D=0,1,2\ldots$ is the ID of the range, and each range has 100 values, for example. Different D values may designate different encapsulation schemes, while the values in the range may designate different payload compression algorithms. An encapsulation scheme specifies the format with which multiple IP packets are encapsulated into one IP packet. For example, D=0 may represent a specific encapsulation scheme, and values 61440–61503 may correspond to the same well-known payload compression algorithms reserved in CPI values 0–63, and values 61504–61539 may designate other compression algorithms. Therefore, if a CPI value is 61440, it can be known that group packet encapsulation in accordance with the present invention and a known encapsulation scheme (D=0) has been applied, and the payload compression algorithm is the well-known algorithm identifier 0.

When header compression is applied, the encapsulation scheme may insert a header compression (HC) header before each packet header contained in the encapsulation packet. The HC header may contain one or more bytes that comprise information of header compression scheme ID, encoding scheme ID, size of the following header, and context identifier (CID). Header compression schemes specify types of header compression such as Null-header-compression, IP-TCP header compression, IP-UDP header compression, and IP-UDP-RTP compression, etc. Null-header-compression indicates that the following header is not compressed, which allows selective header compression in one encapsulation packet. Encoding schemes specify encoding algorithms used for encoding compressed headers. If an implementation will support only one encoding scheme for each header compression scheme, it is not necessary for the HC header to include an encoding scheme ID. A specific encapsulation scheme may also indicate whether any header compression has been applied or not, and therefore whether a HC header has been inserted before each packet header or not in the encapsulation packet.

With the encapsulation protocol of the present invention, header and/or payload compression can be optional. Group packet encapsulation, even without compression, significantly increases communication performance in most cases, especially when each encapsulated packet is short. Group packet encapsulation reduces the overheads associated with data link layer framing and with packet routing. Therefore, unlike the IPComp protocol, as an example, the encapsulation protocol of the present invention can be applied to payload data that is not compressible, such as speech and video data in voice and video over IP communications. Group packet encapsulation combining with header and/or payload compression can further reduce the encapsulation packet size and therefore achieve higher performance.

To allow the same encapsulation protocol to support optional payload compression, the encapsulation protocol can further designate a special encapsulation CPI value to denote group packet encapsulation with null payload compression. For example, the value 99 in each range $(61540+D*100-1)$, where $D=0,1,2\ldots$ can be used for the null payload compression encapsulation CPI. "Null payload compression" means that packet payloads contained in the encapsulation packet are not compressed. The same encapsulation protocol can also support optional packet header compression by using special encapsulation scheme IDs (i.e., D values) to designate null header compression. "Null header compression" means that packet headers contained in the encapsulation packet are not compressed.

As previously noted, the system and method of the present invention need not use or be backward compatible with the IPComp protocol. Depending on the application of the system, compatibility with other protocols may be favored and implemented in addition to or instead of IPComp, as will be appreciated by those skilled in the art.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in the various figures in which it is presented.

DETAILED DESCRIPTION OF THE PREFERRED EMBODIMENT

The invention is a system and method for group packet encapsulation and (optionally) compression. The system and method increase packet transmission performance between two nodes (e.g., gateways or host computers) by reducing data-link layer framing overhead, reducing packet routing overhead, allowing packet header compression without direct data link connection and increasing loss-less payload compression ratio beyond that otherwise achievable with prior art protocols. In the preferred embodiment, the packets are IP packets and the system and method are a group IP encapsulation and (optionally) compression (GIEC) system and method implementing a GIEC encapsulation protocol that is optionally compatible with IPComp protocol. Note that in the present invention, other encapsulation protocols may also be supported. However, preferably, the GIEC system and method employ the IPComp protocol, as one possible payload compression method for IP packets.

Figure 1:
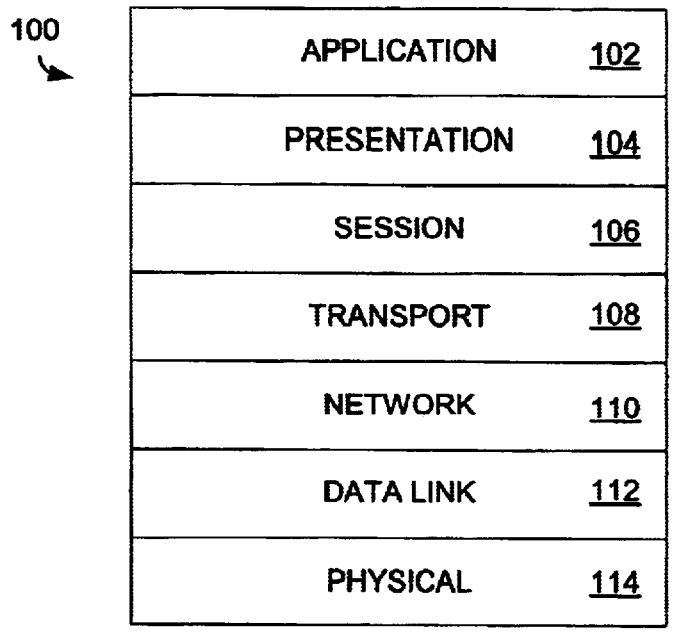
FIG. 1 is a prior art figure of an OSI model.
Figure 2:
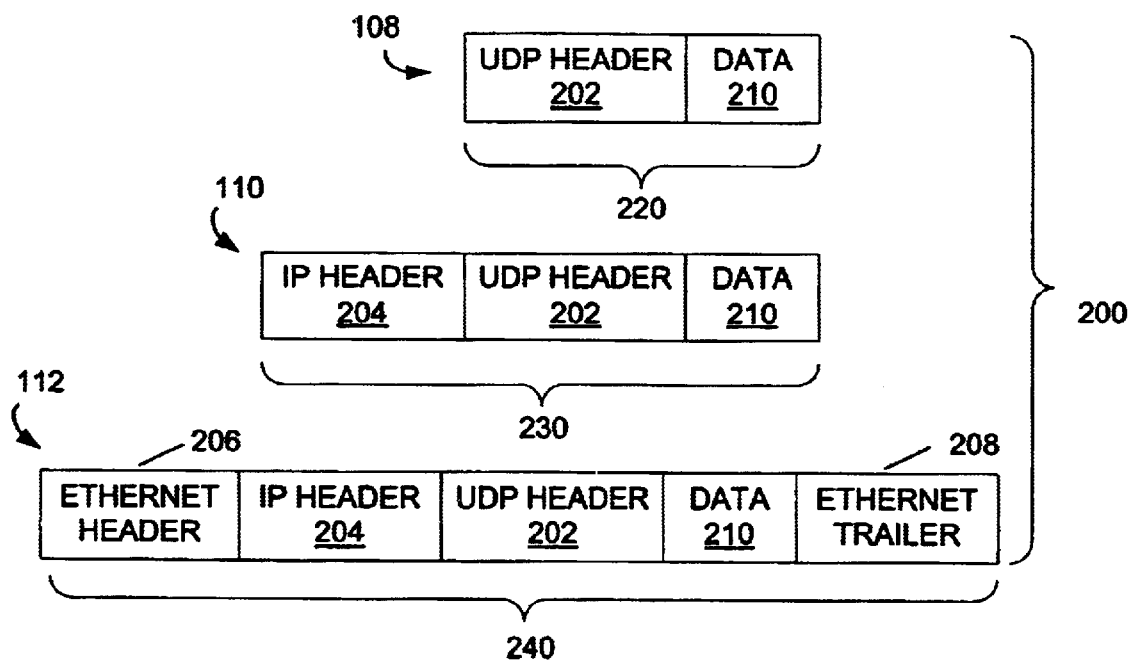
FIG. 2 is a group of diagrams of prior art message formats for UDP/IP over Ethernet in accordance with the OSI model of FIG. 1.
Figure 3:
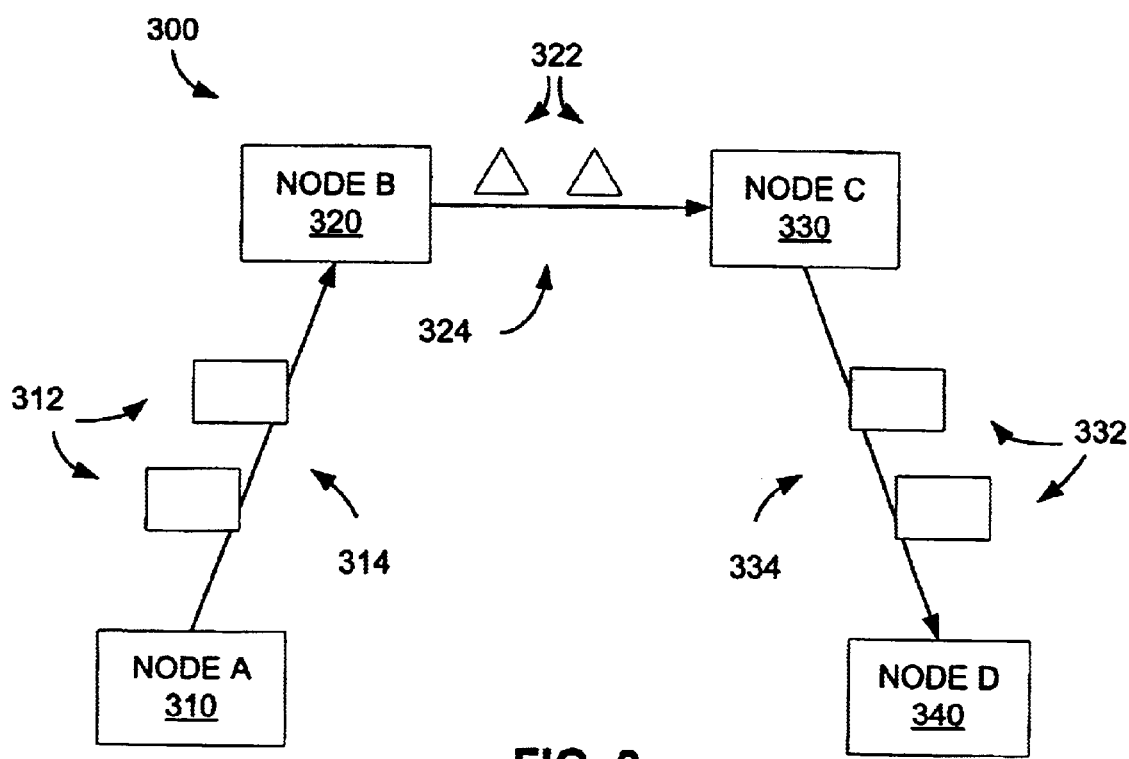
FIG. 3 is a prior art network block diagram depicting the flow of OSI model packets between nodes.

In many situations, an IP communication device can accumulate multiple IP packets in its internal queue before passing them to the data link layer of the OSI model 100 of FIG. 1. The packet accumulation could be the result of, as examples, the TCP/UDP protocol sending multiple packets at the same time, network congestion blocking packets in queue, multiple TCP/UDP flows transmitting simultaneously between two routers, gateways, hosts, or some combination thereof.

In the preferred embodiment, the GIEC system includes GIEC functionality that may be implemented in software, firmware, hardware, or some combination thereof. GIEC functionality is preferably implemented on a plurality of networked communication devices or nodes. A node may be any device capable of generating, transmitting, and/or receiving electronic messages, such as a personal computer (PC), personal digital assistant (PDA), cell phone, e-mail device, pager, Web or network enabled television or appliance, server, gateway, host, router or other such devices. The devices may be networked together over one or more of a plurality of types of networks, such as the Internet, world wide web (Web), intranet, extranet, private network, virtual private network, local area network (LAN), wide area network (WAN), telephone network, cable network, or some combination thereof.

Figure 5A:
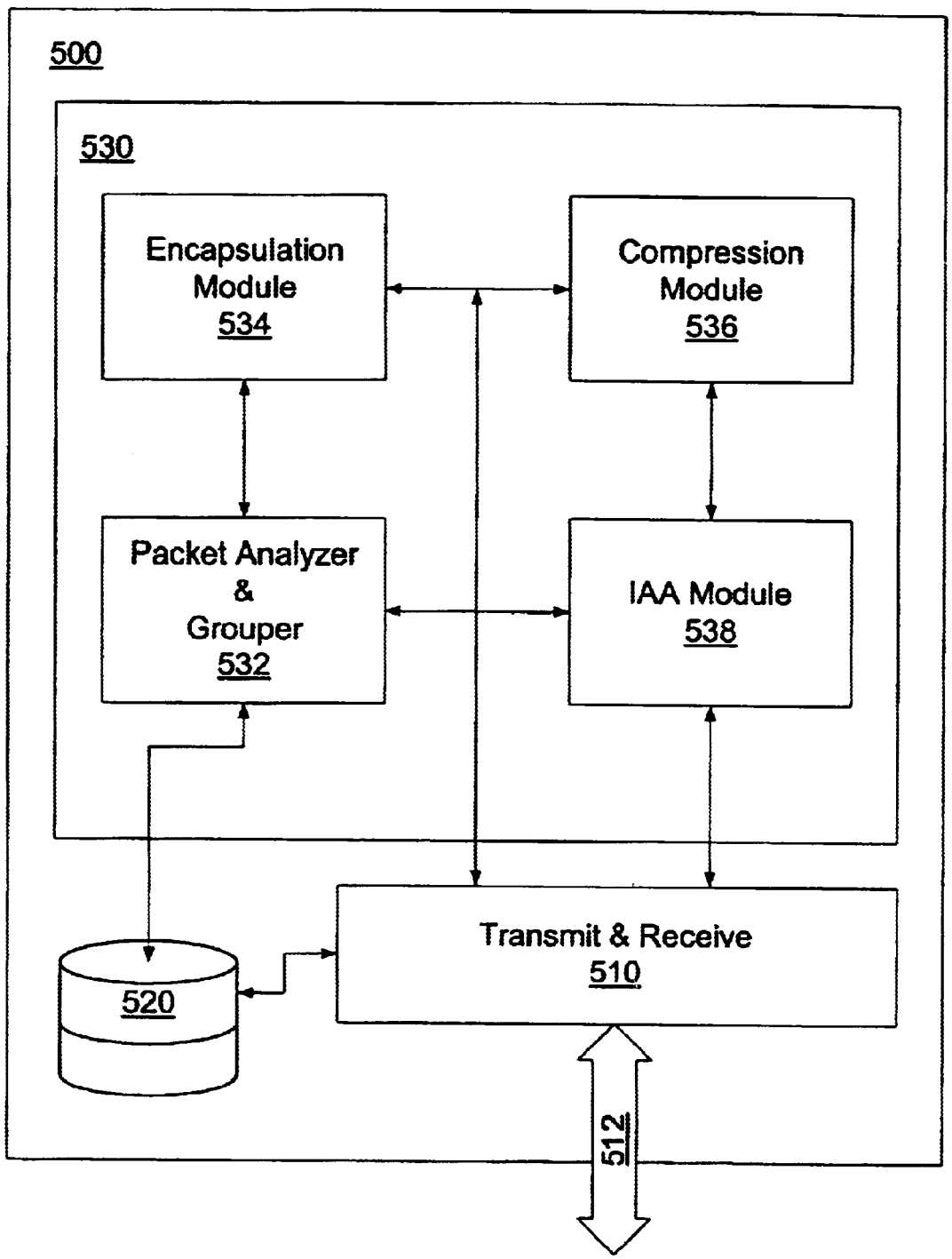
FIG. 5A is a block diagram of GIEC modules in accordance with one embodiment of the present invention and FIG. 5B is a method implemented by the GIEC modules of FIG. 5A.
Figure 5B:
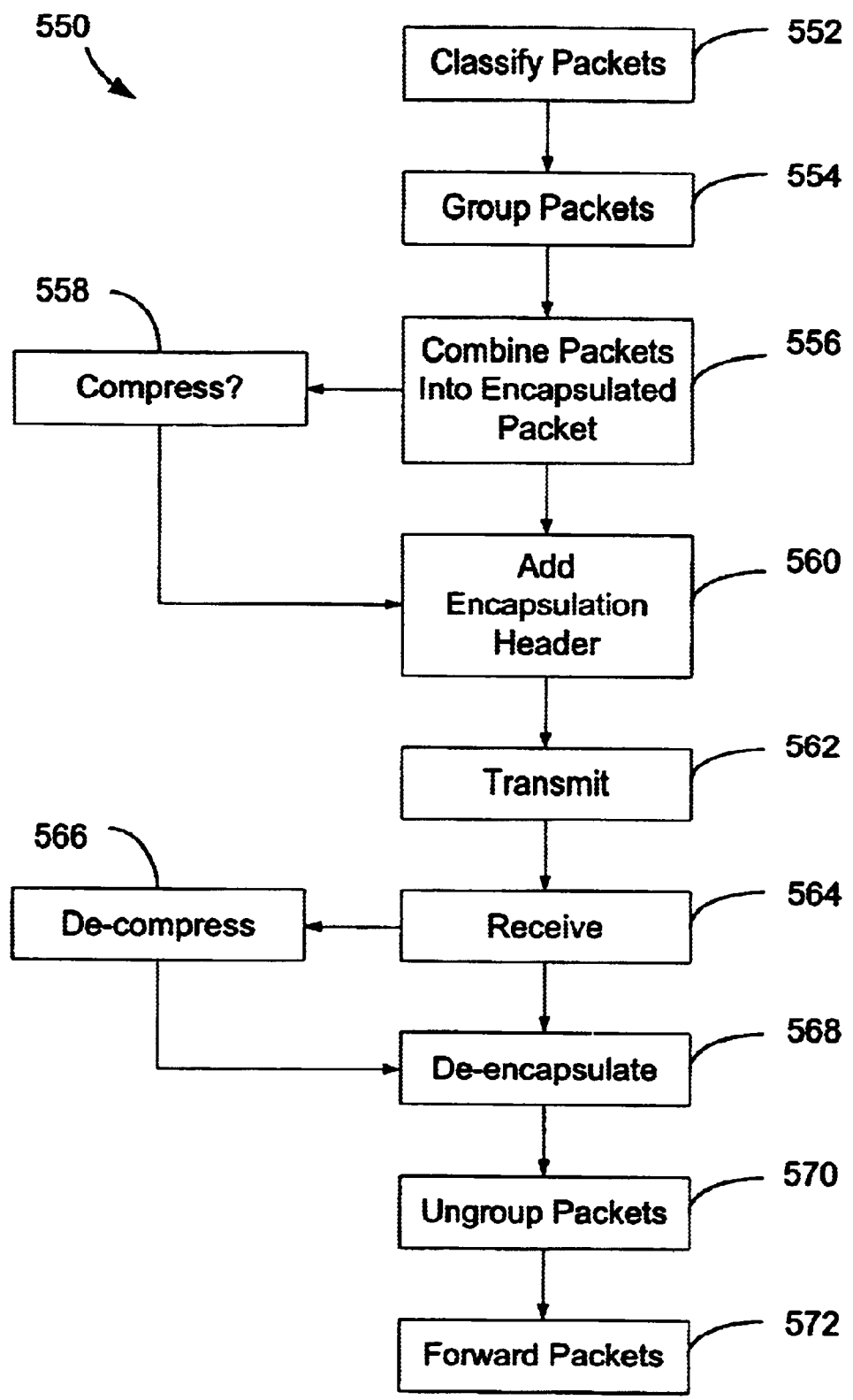

Preferably, the GIEC functionality is implemented as a group of GIEC modules 530, shown in FIG. 5A, that may be hosted on any of the aforementioned types of nodes to implement the method depicted in flowchart 550 of FIG. 5B. The GIEC modules 530 are hosted on a node 500 that includes known communication software 510 configured for conducting-the transmission and reception of messages over a network, having a network interface generally depicted by a double arrow 512. Database (DB) 520 may hold packets and related information and executable files associated with modules 530.

Figure 6:
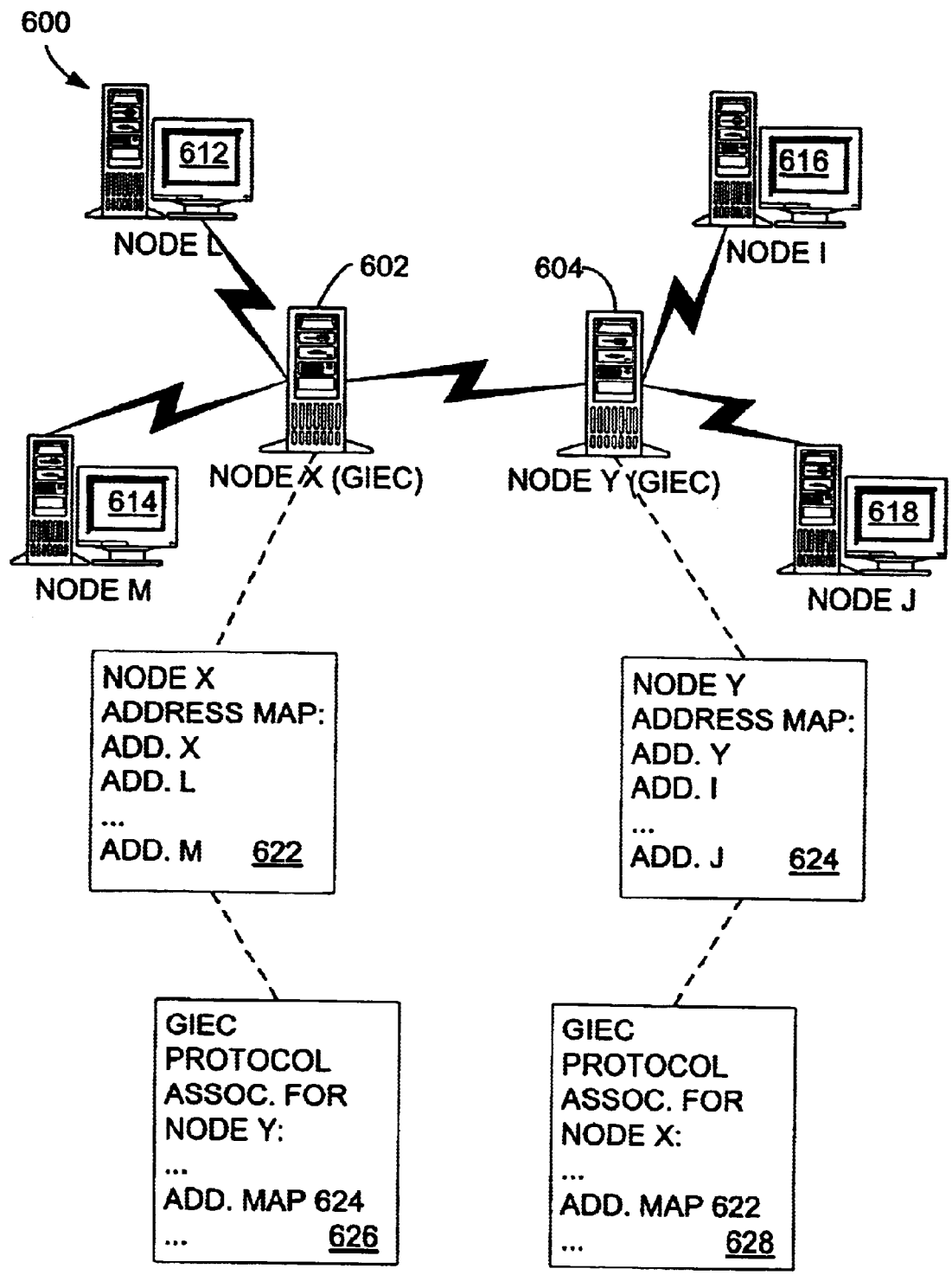
FIG. 6 is a block diagram depicting GIEC protocol associations made at nodes that implement the modules of FIG. 5A and the method of FIG. 5B.

With reference to flowchart 550 of FIG. 5B, in step 552, at a given GIEC node, e.g., Node-X 602 of FIG. 6, packets in queue for transmission are analyzed by packet analyzer & grouper 532 of FIG. 5A and a set of those packets are classified according to a determination that the packets in the set have a common GIEC destination node, e.g., Node-Y 604, in their path. The set of packets going to the GIEC destination node are grouped together and within the group the packets are sequenced, in step 554. Sequencing may be accomplished by any of a variety of manners, such as, for example, a first-in-first-out sequence. Note that it is not imperative that all of the packets in a group (or sequence) be addressed for the same ultimate destination (e.g., the receiving GIEC node or some other non-GIEC node), but rather that a common GIEC node is in the path of the packets in the group, as a GIEC receiving node, regardless of the ultimate destination of those packets.

In step 556, the packets are combined into an encapsulation GIEC packet by encapsulation module 534. There are many possible manners for encapsulating the packets, referred to as encapsulation schemes, some of which are described in more detail with respect to FIGS. 7A, 7B, 7C, 7D, 7E, and 7F. In step 558, optionally, the packet headers, payloads, or both are selectively compressed by compression module 536. Whether compressed or not, a GIEC header (e.g., an IP header with protocol ID identifying GIEC) is added to the encapsulation GIEC packet, in step 560. At some point after determination of the set of packets, an intelligent adaptive algorithm (IAA) module 538 may be used to ensure that the size of the GIEC packet is not greater than the MTU of the communications path. The GIEC packet is transmitted via communication module 510 of FIG. 5A to a destination GIEC node (e.g. Node-Y 604), in step 562. The GIEC packet is received by the destination GIEC node, in step 564, and de-compressed if necessary, in step 566. In step 568, the GIEC packet is deencapsulated. The original group of packets is reconstructed and the packets are ungrouped, in step 570. If the GIEC destination node is not the ultimate destination for a packet, the packet is then forwarded along a path to its ultimate destination, in step 572.

FIG. 6 provides an exemplary block diagram 600 of several nodes configured to communicate across a network. Among the nodes, a Node-L 612 and a Node-M 614 are coupled to GIEC Node-X 602. Also, a Node-I 616 and a Node-J 618 are coupled to GIEC Node-Y 604, wherein Node-X 602 and Node-Y 604 are coupled together. In the preferred embodiment, each of the GIEC Nodes-X and Y includes the GIEC modules 530 of FIG. 5A. Additionally, Node-X 602 includes an address map 622, which may be stored in DB 520. Address map 622 comprises a list of addresses corresponding to devices or nodes to which Node-X can exchange message traffic. Similar to Node-X 602, Node-Y 604 also includes an address map 624 that comprises a list of addresses corresponding to devices or nodes to which Node-Y can exchange message traffic. An address map is used to facilitate and enable communications among nodes listed in the map. For example, as shown in FIG. 6, address map 622 for Node-X, among other possible addresses, includes an Address-X for Node-X 602, an Address-L for Node-L 612, and an Address-M for Node-M 614. An address map for Node-Y 604 includes, among other possible addresses, an Address-Y for Node-Y 604, an Address-I for Node-I 616, and an Address-J for Node-J 608.

Figure 4A:
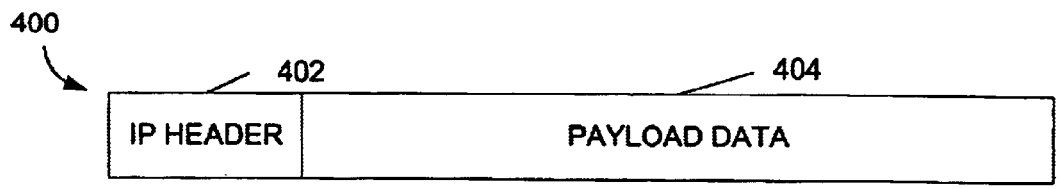
FIG. 4A is a diagram depicting a prior art IP packet and FIG. 4B is a prior art diagram depicting the IP packet of FIG. 4A in compressed form in accordance to IPComp.
Figure 4B:
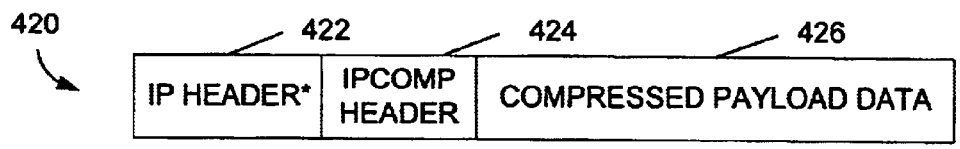
Figure 4C:
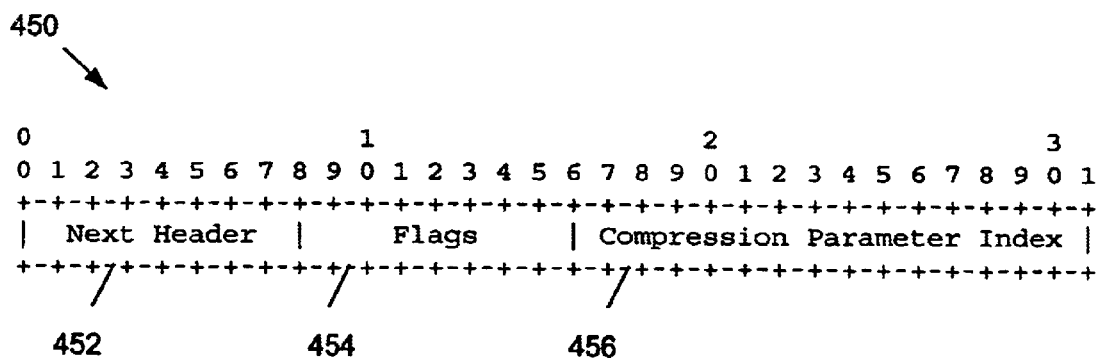
FIG. 4C is a prior art diagram depicting an IPComp header used in the compressed IP packet of FIG. 4B.

Each GIEC node also includes, for each other GIEC node with which it is configured to communicate, a GIEC (protocol) association file. The GIEC association file includes information that facilitates and enables communication between GIEC nodes and, ultimately, to the non-GIEC nodes to which the GIEC nodes are coupled. Accordingly, in FIG. 6, Node-X 602 includes a GIEC association file 626 that includes the address map 624 of Node-Y. Similarly, Node-Y 604 includes a GIEC association file 628 that includes the address map 622 of Node-X 602. If more than one encapsulation scheme is supported between Node-X 602 and Node-Y 604, a GIEC protocol association may include the encapsulation scheme IDs. If packet header compression is to be applied between two GIEC nodes, a GIEC protocol association may also include header compression scheme IDs and their associated header context structures and context identifiers (CID). If packet payload compression is to be applied between two GIEC nodes, a GIEC protocol association may also include compression algorithm IDs, which in the preferred embodiment are encoded into a GIEC CPI value, such as a CPI value 456 of a standard IPComp header, for example, as is shown in FIG. 4C.

A GIEC protocol association can be established in any of a variety of manners. For example, a GIEC protocol association can be manually entered (e.g., by keyboard) with an address map of a remote communication node into an electronic device (e.g., Node-X 602), along with any other relevant optional parameters. As another example, a GIEC protocol association can be established automatically, by employing broadcasting or multicasting protocols, or client-server based database look up methods. A GIEC protocol association can also be updated dynamically between the two communication nodes. For example, when packet header compression is applied, new context structures corresponding to new packet streams may be created dynamically and synchronized between the two communication nodes and saved in a GIEC protocol association. While the GIEC protocol is not known in the art, such protocol association methods are generally known in the art, so are not discussed in detail herein.

To illustrate data communications between GIEC nodes, packet transmission from Node-X 602 to Node-Y 604 is described herein. It is assumed that a GIEC protocol association 626 for Node-Y 604 has been established on Node-X 602. In this example, the GIEC protocol association 626 also includes encapsulation scheme IDs, header compression scheme IDs and their associated context structures and CIDs, and payload compression algorithm IDs. In any event, for each pair of GIEC nodes, the supported header compression schemes and payload compression algorithms must be agreed upon in order for the compression and decompression to be successfully implemented by the nodes. That is, for. example, Node-X 602 must use a compression algorithm that is accommodated by Node-Y, so that Node-Y can decompress the.packets sent by Node-X. As mentioned above, preferably, the GIEC protocol employs the IPComp protocol as the base protocol for payload compression and packet formatting. Accordingly, GIEC CPI values are chosen to be in the range of (61440+D*100)–(61540+D*100–1), where D=0,1... designating an encapsulation scheme, and the value (61540+D*100–1) designating the GIEC null payload compression CPI, as described below.

If compression is to be applied, compression module 536 of FIG. 5A compresses the encapsulation (or the plain) IP packet according to a known header compression scheme and/or payload compression algorithm. If payload compression has been performed with a compression algorithm identifier, denoted as "C–ID", the CPI value of the IPComp protocol header (see FIG. 4C) is set to (61440+D*100+C–ID) if it's an encapsulation GIEC IP packet or it is set to CID if it's a plain IP packet. If no payload compression is applied, the CPI value is set to the GIEC null compression CPI value (61540+D*100–1). If header compression is applied, the encapsulation scheme inserts a HC (header compression) header before each compressed or uncompressed packet header. The HC header comprises a header compression scheme ID, size of the following header, and CID identifying the context structure used in compression. The header compression scheme ID indicates what type of header and whether the header has been compressed or not. If the header is not compressed, the HC header may not comprise the CID. More detail description about HC header will be discussed according to FIGS. 8A and 8B.

Payload compression can also be done selectively on portions of the IP packet sequence to be encapsulated. For example, if encoded speech packets and keyboard message packets are encapsulated together, the keyboard message packets can be compressed while encoded speech packets may not be compressible. The selective payload compression can be done before encapsulation or after encapsulation, and it may require special encapsulation scheme to accommodate the information.

Assume that Node-X 602 has transmitted a GIEC IP packet to Node-Y 604, which is received by communication transmit and receive module 510 via interface 512 at Node-Y 604 and passed to the packet analyzer and grouper 532 for further GIEC processing. If the IP header contains a GIEC protocol identifier, it is a GIEC protocol processed IP packet. In the preferred form, the GIEC protocol employs the IPComp protocol and the GIEC protocol identifier uses the same IPComp protocol identifier that has been assigned the value of 108 by the Internet Standard Organization (ISO). The CPI value is retrieved from the IPComp header. If the CPI value is not a GIEC CPI value that is, not in the range of (61440+D*100)–(61540+D*100–1), D=0,1..., the packet is a regular IPComp packet, and no packet encapsulation or header compression has been applied and the payload compression algorithm ID (C–ID) is the CPI value. If the CPI value is a GIEC CPI value in the range of (61440+D*100)–(61540+D*100–1), D=0,1..., the encapsulation scheme ID value D and the payload compression algorithm identifier C–ID can be retrieved easily. The encapsulation scheme ID specifies the packet encapsulation format and whether or not header compression has been applied to any inner packet header.

At Node-Y, if payload compression has been applied, i.e., the C–ID value is not a null payload compression ID, the compressed payload is decompressed by compression module 536 using the corresponding decompression algorithm designated by the C–ID. If the C_ID is a null payload compression ID, payload decompression is not necessary. If the CPI is a GIEC CPI value and the encapsulation scheme ID value (D) indicates header compression has been applied, each of the compressed headers in the encapsulation packet will be decompressed by compression module 536. After decompression, encapsulation module 534 de-encapsulates the decompressed GIEC IP packet, and recovers the original IP packet sequence. It should be emphasized here that other protocol designs employing known protocol compression can be used by the GIEC protocol, and the identification of a GIEC packet may be based on other information embedded in a GIEC IP packet.

PACKET ENCAPSULATION SCHEMES

Figure 7A:
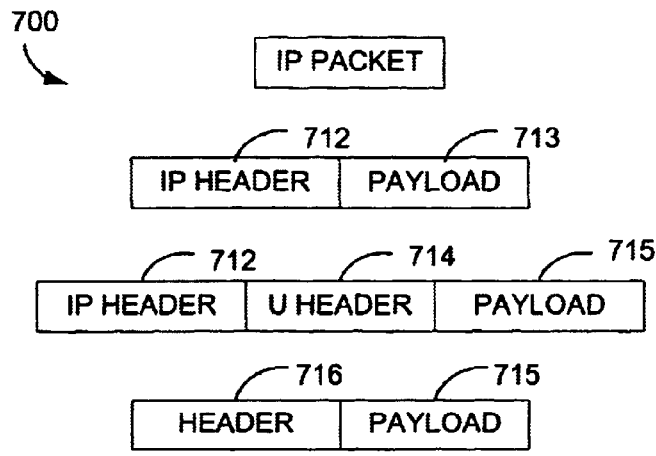
FIGS. 7A (prior art), 7B (prior art), 7C (prior art), 7D, 7E, and 7F are diagrams depicting various GIEC encapsulation schemes implemented by the modules of FIG. 5A and the method of FIG. 5B.
Figure 7B:
Figure 7C:
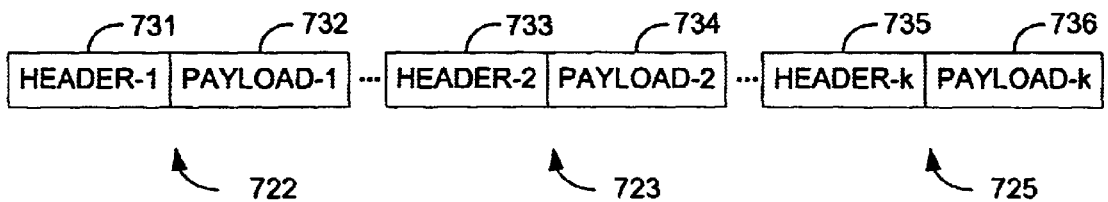

A packet encapsulation scheme defines the format for the encapsulation of packets into a GIEC packet. There could be many different encapsulation schemes for the encapsulation of packets. For the most part, a primary requirement for an encapsulation algorithm in accordance with the present invention is that the GIEC IP packet can be uniquely deencapsulated to recover the original IP packet sequence. Some examples of known encapsulation schemes are shown in FIGS. 7A 7B and 7C, and encapsulation schemes in accordance with the present invention are shown in FIGS. 7D, 7E and 7F. FIG. 7A shows different components of an IP packet 700. An IP packet 700 comprises an IP header 712 and an IP payload 713. The IP payload 713 comprises upper layer protocol header (U header) 714 and payload 715. The U header 714, for example, could be a TCP header, UDP header, or UDP/RTP header. The IP header 712 and the U header 714 together are referred to as header 716. Assume there are a plurality of IP packets in queue at Node-X 602, designated as IP-1, IP-2, ... IP-n. Also, within this plurality of IP packets, let there be a set, sequence or subsequence of outgoing IP packets in queue at Node-X 602, designated as IP-1, IP-2, ... IP-k where k<=n. Each packet in the set, sequence, or subsequence has a destination IP address that corresponds to an address in address map 624 contained in the GIEC protocol association 626 for Node-Y 604. Once determined, the set, sequence, or subsequence of packets, e.g., IP-1, IP-2, ..., IP-k, is designated for encapsulation into one GIEC packet.

The grouped set, sequence, or subsequence of packets (i.e., IP-1, IP-2, ..., IP-k), as the case may be, is encapsulated by the encapsulation module 534 of FIG. 5A into one GIEC packet to be transmitted to the destination GIEC node. FIGS. 7B, 7C, 7D, 7E, and 7F demonstrate various encapsulation schemes of encapsulating a packet sequence 720 into a single GIEC IP packet. FIG. 7B shows the packet sequence 720, including IP packets: IP packet-IP packet-2. . . IP packet-k. FIG. 7C shows the same sequence.720 where each packet is shown to include two components, i.e., a header 731 and a payload 732, for example. FIGS. 7D, 7E, and 7F show three encapsulation schemes for encapsulating the packet sequence 720 into a GIEC IP packet, in accordance with the present invention.

FIG. 7D illustrates an encapsulation scheme A as one form of GIEC IP packet780, wherein the IP packet sequence 720 of FIG. 7B has been encapsulated. Encapsulation scheme A supports payload compression. The GIEC IP packet 780 is sent from Node-X 602 to Node-Y 604. The GIEC IP Header 741 is an IP header with total length, checksum, etc. derived from the IP encapsulation payload 790. GIEC IP Header 741 includes the address of Node-X 602 as a source address, and the address of Node-Y 604 as destination address. The GIEC IP packet 780 comprises the IP packet sequence 720 in the payload that can be further compressed with compression algorithm ID encoded in the IPComp header 742. FIG.7E illustrates an encapsulation scheme B as form of a GIEC IP packet 782, wherein the IP packet sequence 720 of FIG. 7B has been encapsulated. Encapsulation scheme B supports both payload compression and header compression. The GIEC IP packet 782 is sent from Node-X 602 to Node-Y 604. The GIEC IP Header 750 is an IP header with total length, checksum, etc. derived from the GIEC IP encapsulation payload 792. GIEC IP Header 750 comprises the address of Node-X 602 as source address and the address of Node-Y 604 as destination address. The GIEC IP packet 782 comprises the IP packet sequence 720 in the payload with packet headers 731, 733, and 735 and payloads 732, 734, and 736 separated in different parts of the payload. A one-byte "No. of packets" field 754 equaling to the number of packets in the packet sequence 720 is inserted after the IPComp header 752 to help Node-Y 604 easily de-encapsulate the GIEC IP packet. A header compression (HC) header (756, 758, and 760) is inserted before each compressed header (731, 733, and 735). Encapsulated payloads 732, 734, and 736 can be compressed independently.

The HC headers (756, 758; and 760) comprise information that allows Node-Y 604 to decompress each compressed header and recover the original header (731, 733, and 735).

Figure 8A:
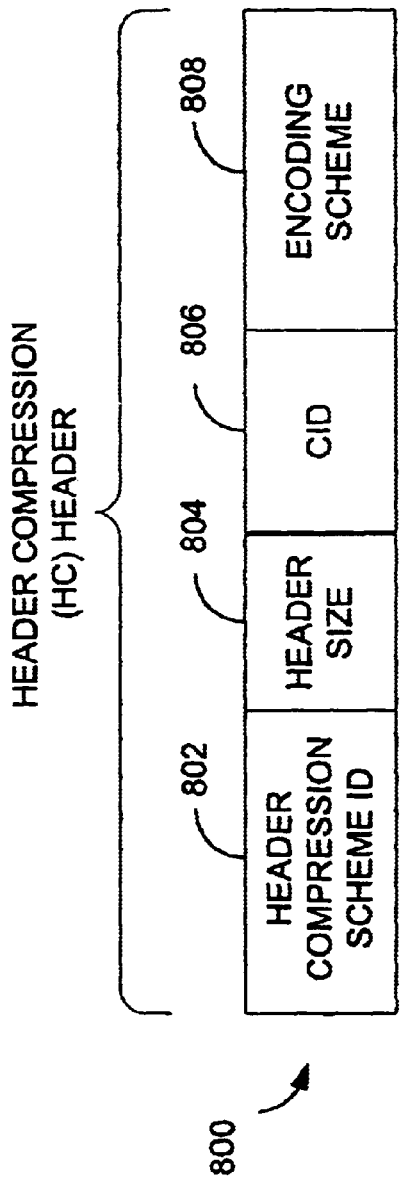
FIGS. 8A and 8B are diagrams depicting HC header formats used for packet header compression for GIEC packets in accordance with the present invention.

FIG. 8A shows an exemplary composition of a HC header 800, such as the HC headers of FIG. 7E. HC header 800 comprises an "header compression scheme ID" field 802, "header size" field 804, "CID (context ID)" field 806, and "encoding scheme" field 808. The "header compression scheme ID" 802 specifies the compression scheme used in header compression. For example, header compression schemes may implement IP_NULL for no header compression, IP_TCP for IP/TCP header compression, IP_UDP for IP/UDP header compression, and IP_UDP_RTP for IP/UDP/RTP header compression. The header size field 804 specifies the compressed or uncompressed header size and the CID field 806 specifies the identifier of the context structure on which the header compression is based. If the header compression scheme is IP_NULL (i.e., no compression), the CID field 806 can be empty or does not exist.

Figure 8B:
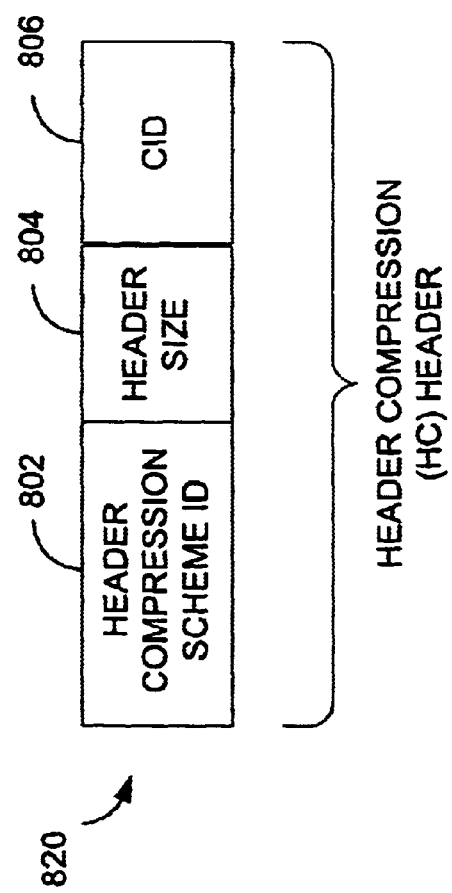

The encoding scheme field 808 specifies the encoding method used in representing the following compressed header. Typically, there is one encoding scheme for each header compression scheme, and therefore the encoding scheme field 808 is not required, as shown in FIG. 8B. When Node-X 602 is to compress a packet header, it searches a context structure matching the packet header, compresses the packet header using the context structure, and encodes the CID associated with the context structure in the HC header inserted before the compressed header. When Node-Y 604 is to decompress a compressed packet header, it retrieves the context structure using the CID encoded in the HC header inserted before the compressed packet header, and decompresses the packet header using the context structure.

FIG. 7F illustrates encapsulation scheme C as one form of a GIEC IP packet 784, wherein the IP packet sequence 720 of FIG. 7B has been encapsulated. With encapsulation scheme C, the GIEC IP header** 762 is derived from the IP header of IP packet-1 722 (see FIG. 7B) to eliminate one extra IP header added in the encapsulation. The original source address 770 and destination address 768 of the IP packet-1 722 header may be replaced with the address of Node-X 602 and address of Node-Y 604, respectively. The original source address 770 and destination address 768 of the IP packet-1 722 header may also be saved in the encapsulation payload 794 such that the IP packet-1 722 header can be reconstructed by NodeY 604. The GIEC IP header 762 also replaces other fields such as checksum, total length, and protocol ID in the IP packet-1 722 header. The protocol ID in the IP packet-1 722 header is saved in the "Next header" 452 in the IPComp header 450 as shown in FIG. 4C. The total length of the IP packet-1 722 header is saved in 766 as part of the encapsulation payload. The encapsulation payload can be further compressed. Encapsulation scheme C does not show header compression. However, encapsulation scheme C can be revised to include header compression in accordance with the present invention, as would be appreciated by those skilled in the art.

INTELLIGENT ADAPTIVE ALGORITHM (IAA) FOR GROUP PACKET SELECTION

Prior to being transmitted from a first GIEC node to a second GIEC node, when a set, sequence, or subsequence of packets is encapsulated into a GIEC packet, it is desirable that the number of packets in the sequence be limited such that the resultant GIEC packet does not exceed the MTU; exceeding the MTU would cause packet fragmentation. If there is no header compression or payload compression applied, the total length of the GIEC packet can be easily determined for a given encapsulation scheme and a given sequence of packets to be encapsulated and, therefore, the maximum number of packets in the sequence to be encapsulated can be easily determined. If header compression, payload compression, or both are applied, the total length of the GIEC packet cannot be determined before compression has been performed. Therefore, the limit on the number of packets in the sequence to be encapsulated cannot be easily determined. The total length of the GIEC packet, however, can be estimated based on compression ratios estimated from the compression results for previous sequences of packets. For sequences of packets that belong to the same packet stream or similar streams where packets contain similar characteristics and compressibility, compression ratios from sequence to sequence are ususally consistent and the estimated compression ratios would be more accurate. When the estimated compression ratios are known, the total length of the GIEC packet can be estimated for a given sequence of packets before any compression is performed, and therefore, the limit on the number of packets in the sequence can be estimated. The IAA module 538 of FIG. 5A is an optional module performing this functionality. The IAA module 538 estimates the allowed maximum length of the GIEC packet before any compression is performed, based on the estimated compression ratios for header compression and for payload compression and the MTU of the transmission path between the two GIEC nodes in question. To estimate the allowed maximum length of a GIEC packet, denote a packet sequence to be encapsulated as IP-1, IP-2, . . . , IP-k, k>=1. As an example, assume the encapsulation scheme B as shown in FIG. 7E is used and assume the following notations:

LPS: size of IP packet header field 750
ICS: size of the IPComp header field 752
NPS: size of the No. of packets field 754
HCS: size of the HC header 756, 758, and 760
HDS(k): size of all encapsulated headers 731, 733, and 735 of the packet sequence
IP-1, IP-2 . . . IP-k before any header compression
HDSC(k): size of all encapsulated headers 731, 733, and 735 of the packet sequence
IP-1, IP-2 . . . IP-k after header before compression
PYS(k): size of all encapsulated payloads 732, 734, and 736 of the packet sequence
IP-1,IP-2, . . . IP-k before any payload compression
PYSC(k): size of all encapsulated payloads 732, 734, and 736 of the packet sequence
IP-1,IP-2, . . . IP-k after payload compression
RH: compression ratio for header compression that is equal to $HDS(k)/HDSC(k)$
RP: compression ratio for payload compression that is equal to $PYS(k)/PYSC(k)$
RHE: estimated value for the RH
RPE: estimated value for the RP
GPS(k): size of the GIEC packet 782 after header and payload compression have been performed
GGSE(k): estimated size of the GIEC packet 782 after header and payload compression have been performed based on the values of RHE and RPE According to the encapsulation scheme B shown in FIG. 7E, the GPS(k) value, size of the GIEC packet 782 after header and payload compression have been performed, can be obtained as:

$$GPS(k)=LPS+ICS+NPS*k+HDSC(k)+PYSC(k)$$

The HDSC(k) and PYSC(k) cannot be known before header and payload compression have been performed. The estimated values for HDSC(k) and PYSC(k) however can be obtained based on the estimated compression ratios of RHE and RPE and the HDS(k) and PYS(k), respectively. Therefore, the GGSE(k), the estimated size of the GIEC packet 782 after header and payload compression have been performed, can be obtained by:

$$GGSE(k)=LPS+ICS+NPS+NPS*k+HDS(k)/RHE+PYS(k)/RPE$$

It is desirable that GGSE(k)<=MTU, which determines the maximum number (k) of packets in the sequence IP-1, IP-2 . . .IP-k. Denote the maximum number of packets as "mk," and the equation becomes:

$$GGSE(mk)<=MTU, \text{ and } GGSE(mk+1)>MTU$$

The GGSE(k) value can be computed for each k before header compression and payload compression is performed.

After header compression and payload compression have been performed, the HDSC(k) and PYSC(k) values are known, and therefore the true compression ratios RH and RP can be obtained as $RH=HDS(k)/HDSC(k)$ and $RP=PYS(k)/PYSC(k)$. The RHE and RPE can then be updated for the encapsulation of the next sequence of packets. For example, the update formula can be:

$$RHE=alpha*RHE+(1-alpha)*RH, \text{ where } 0<=alpha<=1$$

and $$RPE=beta*RPE+(a-beta)*RP, \text{ where } 0<=beta<=1$$

The preferred selection process for a sequence of packets IP-1, IP-2 . . . IP-k to be encapsulated using encapsulation scheme B shown in FIG. 7E may be summarized as follows:

1) For a given k, compute GGSE(k)=LPS+ICS+NPS+NPS*k+HDS(k)/RHE+PYS(k)/RPE The initial values for RHE and RPE can be set to 1.
2) If GGSE(k)<=MTU, include packet IP-k to the sequence for encapsulation. If GGSE(k)>MTU, do not include IP-k to the sequence for encapsulation, and start encapsulating the sequence IP-1, IP-2 . . . IP-(k-1), and perform header and payload compression.
3) Obtain RH=HDS(k)/HDSC(k) and RP=PYS(k)/PYSC(k) after header and payload compression have been performed. Update the RHE and RPE values by:

$$RHE=alpha*RHE+(1-alpha)*RH, \text{ where } 0<=alpha<=1$$

$$RPE=beta*RPE+(a-beta)*RP, \text{ where } 0<=beta<=1.$$

Note that in the above description, for illustration purpose, it has been assumed that all packet headers in the sequence of packets have the same compression ratio. This may not be the case if these packet headers belong to different packet streams and have different types or use different context structures for compression. Therefore, instead of using one compression ratio for header compression for estimating the size of the GIEC packet after compression, multiple compression ratios for header compression, each for a different packet stream, may be used and updated independently. Similarly, if the packet payloads in the sequence of packets are to be grouped according to packet streams and compressed group-by-group, multiple compression ratios, each for different group, may be used and updated independently.

When data compression cannot reduce the packet size, group packet encapsulation can still improve the transmission performance through reduced routing overhead and reduced data link layer framing overhead. Therefore, as long as the resultant GIEC IP packet with null compression does not exceed the MTU, it is transmitted.

As previously mentioned, use of the GIEC system and protocol leads to savings in bandwidth. That is, the GIEC protocol improves transmission performance by reducing the overheads of data link layer framing and IP packet routing, compressing encapsulated packet headers without requiring link-by-link connection, and increasing the payload compression ratio. For instance, the typical data link layer framing overhead ranges from about 10 to 30 bytes per IP packet for ATM, PPP, and Ethernet, and the packet header overhead ranges from 20 to 40 bytes per IP packet for IP/TCP, IP/UDP, and IP/UDP/RTP. These overheads are greatly reduced with the encapsulation and, preferably the compression. The reduction in framing and packet header overheads can be significant for real-time interactive applications, such as Telnet and voice over IP (VoIP), where each IP packet has 20 to 100 bytes of payload data. Great benefits are achieved even if the data itself is not compressible (i.e., loss-less), such as with encoded speech data.

To illustrate such benefits, following are examples of communications between two gateways where multiple VoIP channels may be simultaneously transmitted over an Ethernet connection. Assuming each voice channel uses UDP/RTP protocol for transmitting speech data, and assuming 20 bytes of encoded speech data are transmitted every 20 millisecond, then for each voice channel, we have an IP packet of 60 bytes (i.e., 20 bytes of encoded speech data +12 bytes of RTP header +8 bytes of UDP header +20 bytes of IP header) every 20 milliseconds. When the IP packet is transmitted over an Ethernet frame, the frame introduces another 26 bytes of framing overhead (i.e., 8 bytes of preamble +14 bytes of frame header +4 bytes of frame trailer), resulting in a total of 86 bytes transmitted over the cable every 20 milliseconds, which is 34.4 kbits/second. Assuming there are 10 voice channels transmitted between these two gateways, the total bandwidth consumption on each direction would be 344 kbits/second.

Assuming the GIEC protocol is used with encapsulation scheme B shown in FIG. 7E, on every 20 milliseconds, 10 IP packets for the 10 voice channels can be encapsulated into one IP packet. Further assuming that IP/UDP/RTP header compression is performed, which typically can reduce the IP/UDP/RTP header to 4 bytes, and assuming each HC header is 3 bytes and the "No. of packets" 754 is 1 byte, then the total length of the GIEC packet is 295 bytes (20 bytes of GIEC IP header +4 bytes of IPComp header +1 byte of number of packets +3*10 of all HC headers +4*10 of all compressed IP/UDP/RTP headers +20*10 of all voice payloads). The GIEC IP packet is still well below the MTU, which is about 1500 bytes for Ethernet. Therefore, the GIEC IP packet can be transmitted over one Ethernet frame. The result is an Ethernet frame of 321 bytes (295 bytes of GIEC packet +26 bytes framing overhead) transmitted over the cable every 20 milliseconds, that is 128.4 kbits/second. A savings of about 62% of bandwidth consumption for 10 voice channels is realized. Alternatively, for the same bandwidth of 344 kbits/second, 29 voice channels instead of 10 channels can be transmitted without sacrificing voice quality.

For broadband DSL and cable modem access, multiple layers of framing overheads may be involved for each IP packet. For DSL, it may involve IP over PPP and PPP over ATM encapsulations. For cable modem, it may involve IP over Ethernet frame and Ethernet frame (without preamble) over MAC protocol encapsulations. For these networking technologies, similar bandwidth saving can be achieved.

For those payload data that is compressible such as in applications like Telnet and thin client terminals, by further compressing payloads encapsulated in the GIEC IP packet, bandwidth savings can be further increased.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A method of preparing packets queued at a first node for transmission to a second node, wherein a maximum transmission unit (MTU) of the path between said first node and second node is known, and said method includes:

A. classifying a set of said packets as a function of having a common second node in a transmission path of each packet in said set of packets, wherein said second node is configured to de-encapsulate said set of packets;

B encapsulating said set of packets into an encapsulation payload;

C. deriving an encapsulation packet header from said encapsulation payload, said encapsulation packet header including a destination address;

D. combining said encapsulation packet header with said encapsulation payload to form an encapsulation packet, E. determining whether said encapsulation packet exceeds said MTU, and F. if said MTU is exceeded, eliminating one or more packets from said set of packets to form a new set of packets and repeating parts B through F.

2. The method of claim 1, further comprising, after part B:

G. compressing at least a portion of said encapsulation payload, wherein said second node is configured to decompress said encapsulation payload.

3. The method of claim 1, wherein each packet in said set of packets comprises a header and a payload, said method further comprising, prior to part E:

G. compressing headers of a plurality of packets in said set of packets in said encapsulation payload, wherein said second node is configured to decompress said compressed headers in said encapsulation payload.

4. The method of claim 1, wherein each packet in said set of packets comprises a header and a payload, said method further comprising, prior to part E:

G. compressing payloads of a plurality of packets in said set of packets in said encapsulation payload, wherein said second node is configured to decompress said compressed payloads in said encapsulation payload.

5. The method of claim 1, wherein said packets are EP packets having a header chosen from a group comprising:
1) IP header;
2) IP/TCP header;
3) IP/UDP header;
4) IP/UDP/RTP header;
5) IP/UDP/RTCP header;
6) IP/FTP header;
7) IP/TFTP header;
8) IP/HTTP header;
9) EP/SMTP header;
10) IP/POP header;
11) IP/SNMP header;
12) IP/TELNET header;
13) IP/DNS header;
14) IP/IPSEC header;
15) IPINFS header;
16) IPINetBIOS header; and
17) IPIRPC header.

6. The method of claim 1, wherein said packets are IP packets and said packets include data chosen from a group comprising:
1) static data;
2) audio data;
3) video data;
4) voice over EP data; and
5) video over P data.

7. The method of claim 1, wherein said set of packets includes at least two packets and each packet in said set of packets includes a header and a payload and part B includes:
1) combining at least two of said headers; and
2) combining at least two of said payloads.

8. The method of claim 7, further comprising compressing said combined headers.

9. The method of claim 7, further comprising compressing said combined payloads.

10. The method of claim 1, further including computing a size value and a checksum value for said encapsulation packet.

11. The method of claim 1, wherein each packet in said set of packets comprises a header and a payload and wherein said encapsulation packet header is derived from a first packet header.

12. The method of claim 11, wherein said method further includes:
G. compressing at least a portion of said encapsulation packet payload using a compression algorithm,
wherein said encapsulation packet includes a compression identifier, wherein said compression identifier indicates the compression algorithm used by said first node to compress said portion of encapsulation packet payload.

13. The method of claim 1, wherein said classifying a set of said packets in Part A includes matching a destination address contained in a packet, from said set of packets, with at least one of a plurality of addresses for devices configured to couple to said second node.

14. The method of claim 2, wherein said first node and said second node are coupled together via a network that includes at least one of the following:
1) Internet;
2) world wide web;
3) extranet;
4) cable network;
5) private network;
6) LAN;
7) WAN;
8) virtual network; and
9) telephone network.

15. The method of claim 1, wherein said classifying a set of said packets in Part A includes matching a destination address contained in a packet, from said set of packets, with at least one of a plurality of addresses for devices configured to couple to said second node.

16. A method of data communication between a first node having packets queued thereat and a second node, wherein a maximum transmission unit (MTU) of the path between said first node and second node is known, and said method includes:
A. classifying a set of said packets as a function of having said second node in a transmission path of each packet in said set of packets;
B grouping said set of packets to form a sequence of packets;
C. encapsulating said sequence of packets as an encapsulation payload;
D. deriving an encapsulation packet header from said encapsulation payload, said encapsulation packet header including a destination address;
E. combining said encapsulation packet header and said encapsulation payload as an encapsulation packet;
F. determining whether said encapsulation packet exceeds said MTU;
G. if said MTU is exceeded, eliminating one or more packets from said set of packets to form a new set of packets and repeating parts B through G;
H. transmitting said encapsulation packet from said first node to said second node;
I. receiving said encapsulation packet at said second node; and
J. de-encapsulating said encapsulation packet at said second node.

17. A data communication system having a first node coupled to a second node, wherein a maximum transmission unit (MTU) of the path between said first node and second node is known to said first node, said system comprising:
A. said first node including a storage device having packets queued therein, said first node comprising:
1) a packet analyzer module, configured to group a set of said packets as a function of said second node being in a transmission path of each packet in said set of packets, wherein each packet in said set of packets comprises a header and a payload;
2) an encapsulation module, configured to generate an encapsulation packet including an encapsulation payload derived from said set of packets and a encapsulation packet header;
3) a compression module, configured to compress said headers of a plurality of packets in said set of packets in said encapsulation payload, wherein said compression module is configured to estimate a compression ratio related to said encapsulation packet;
4) an intelligent adaptive module, configured to estimate the size of said encapsulation packet as a function of said compression ratio and a size of each packet in said set of packets and to determine whether said encapsulation packet exceeds said MTU;

5) a first communication module configured to transmit said encapsulation packet to said second node; and B. said second node including a storage device, said second node comprising:
1) a second communication module configured to receive said encapsulation packet;
2) a de-encapsulation module, configured to de-encapsulate said encapsulation packet, wherein said de-encapsulation includes reforming each packet in said set of packets from said encapsulation packet; and
3) a decompression module, configured to decompress said compressed headers in said encapsulation payload.

18. The system of claim 17, wherein said intelligent adaptive module is configured to eliminate at least one packet in said set of packets if said MTU is exceeded.

19. A data communication system having a first node coupled to a second node, wherein a maximum transmission unit (MTU.) of the path between said first node and second node is known to said first node, said system comprising:

A. said first node including a storage device having packets queued therein, said first node comprising:
1) a packet analyzer module, configured to group a set of said packets as a function of said second node being in a transmission path of each packet in said set of packets;
2) an encapsulation module, configured to generate an encapsulation packet including an encapsulation payload derived from said set of packets and a encapsulation packet header;
3) a first communication module configured to transmit said encapsulation packet to said second node; and
4) an intelligent adaptive module, configured to estimate the size of said encapsulation packet as a function of a size of each packet in said set of packets and determine whether said encapsulation packet exceeds said MTU; and B. said second node including a storage device, said second node comprising:
1) a second communication module configured to receive said encapsulation packet; and
2) a de-encapsulation module, configured to de-encapsulate said encapsulation packet, wherein said de-encapsulation includes reforming each packet in said set of packets from said encapsulation packet.

20. The system of claim 19, wherein said encapsulation module includes:
i. a payload module, configured to encapsulate said set of packets as said encapsulation payload;
ii. a packet header module, configured to derive said encapsulation packet header from said encapsulation payload, said encapsulation packet header including a destination address; and
iii. a combiner module, configured to combine said encapsulation payload and said encapsulation packet header.

21. The system of claim 19, wherein:
said first node further includes:
4) a compression module, configured to compress at least a portion of said encapsulation payload; and
said second node further includes:

3) a decompression module, configured to decompress said compressed portion of said encapsulation payload.

22. The system of claim 19, wherein each packet in said set of packets comprises a header and a payload, wherein:
said first node further includes:
4) a compression module, configured to compress headers of a plurality of packets in said set of packets in said encapsulation payload; and
said second node further includes:
3) a decompression module, configured to decompress said compressed headers in said encapsulation payload.

23. The system of claim 19, wherein each packet in said set of packets comprises a header and a payload, wherein:
said first node further includes:
4) a compression module, configured to compress payloads of a plurality of packets in said set of packets in said encapsulation payload; and
said second node further includes:
3) a decompression module, configured to decompress said compressed payloads in said encapsulation payload.

24. The system of claim 19, wherein, if said MTU is exceeded, said intelligent adaptive module is configured to eliminate at least one packet in said set of packets.

25. The system of claim 19, wherein said second communication module is further configured to route each packet in said set of packets to a next destination, wherein for each packet in said set of packets said next destination is derived from a content of said packet.

26. The system of claim 19, wherein said first node and said second node are coupled together via a network that includes at least one of the following:
1) Internet;
2) world wide web;
3) extranet;
4) cable network;
5) private network;
6) LAN;
7) WAN;
8) virtual network; and
9) telephone network.

27. The system of claim 19, wherein said packets are IP packets including data from a group comprising:
1) static data;
2) audio data;
3) video data; and
4) voice over IP data.

28. The method of claim 19, wherein said packet analyzer module is configured to match a destination address contained in a packet, from said set of packets, with at least one of a plurality of addresses for devices configured to couple to said second node.

29. A GIEC protocol for conducting data communications between a first node having a plurality of IP packets queued thereat, at least some of said IP packets including an IP header and an IP payload, and a second node, wherein a maximum transmission unit (MTU) of the path between said first node and second node is known, said protocol comprising:

A. classifying a set of said IP packets as a function of having said second node in a transmission path of each IP packet in said set of IP packets;

B grouping said set of IP packets to form a sequence of IP packets;

C. encapsulating said sequence of IP packets as an encapsulation payload;

D. deriving an IP encapsulation packet header from said encapsulation payload, said encapsulation packet header including a destination address;

E. combining said EP encapsulation packet header and said encapsulation payload as an IP encapsulation packet;

F. determining whether said encapsulation packet exceeds said MTU;

G. if said MTU is exceeded, eliminating one or more IP packets from said set of IP packets to form a new set of IP packets and repeating parts B through G;

H. transmitting said IP encapsulation packet from said first node to said second node;

I. receiving said IP encapsulation packet at said second node; and

J. de-encapsulating said IP encapsulation packet at said second node, thereby reforming each IP packet in said set of IP packets.

30. The GIEC protocol of claim 29, wherein said IP headers are chosen from a group comprising:
   1) IP header;
   2) IP/TCP header;
   3) IP/UDP header;
   4) IP/UDP/RTP header;
   5) IP/UDP/RTCP header;
   6) IP/FTP header;
   7) IP/TFTP header;
   8) IP/HTTP header;
   9) IP/SMTP header;
   10) IP/POP header;
   11) IP/SNMP header;
   12) IP/TELNET header;
   13) IP/DNS header;
   14) IP/IPSEC header;
   15) IP/NFS header;
   16) IP/NetBIOS header; and
   17) IP/RPC header.

31. The GEC protocol of claim 29, wherein said first node and said second node are coupled together via a network that includes at least one of the following:
   1) Internet;
   2) world wide web;
   3) extranet;
   4) cable network;
   5) private network;
   6) LAN;
   7) WAN;
   8) virtual network; and
   9) telephone network.

32. The GEEC protocol of claim 29, wherein said IP packets include data from a group comprising:
   1) static data;
   2) audio data;
   3) video data; and
   4) voice over IP data.

33. The GIEC protocol of claim 29, wherein said classifying a set of said packets in Part A includes matching a destination address contained in packet, from said set of packets, with at least one of a plurality of addresses for devices configured to coupled to said second node.

* * * * *

UNITED STATES PATENT AND TRADEMARK OFFICE
CERTIFICATE OF CORRECTION

PATENT NO. : 6,618,397 B1
DATED : September 9, 2003
INVENTOR(S) : Zezhen Huang

It is certified that error appears in the above-identified patent and that said Letters Patent is hereby corrected as shown below:

Column 17,
Line 14, after "9)", delete "EP", and insert thereof -- IP --;
Line 20, after "15)", delete "IPINFS", and insert thereof -- IP/NFS --;
Line 21, after "16)", delete "IPINetBIOS", and insert thereof -- IP/NetBIOS --;
Line 22, after "17)", delete "IPIRPC", and insert thereof -- IP/RPC --;
Line 29, after "over", delete "EP", and insert thereof -- IP --;
Line 30, after "over", delete "P", and insert thereof -- IP --;

Column 19,
Line 64, from the beginning, delete "4)", and insert thereof -- 5) --;

Column 20,
Lines 7 and 17, from the beginning, delete "4)", and insert thereof -- 5) --;

Column 21,
Line 8, after "combining said", delete "EP", and insert thereof -- IP --.

Column 22,
Line 9, after "31. The", delete "GEC", and insert thereof -- GIEC --;
Line 21, after "32. The", delete "GEEC", and insert thereof -- GIEC --.

Signed and Sealed this

Tenth Day of February, 2004

JON W. DUDAS
*Acting Director of the United States Patent and Trademark Office*